US008248959B2

(12) United States Patent
Olexa et al.

(10) Patent No.: US 8,248,959 B2
(45) Date of Patent: Aug. 21, 2012

(54) METHODS, APPARATUS AND COMPUTER PROGRAM PRODUCTS FOR BEACON GENERATION AND PROCESSING IN AN OFDM COMMUNICATIONS SYSTEM

(75) Inventors: George Ronald Olexa, Gainesville, GA (US); Rajendra Singh, Alexandria, VA (US)

(73) Assignee: Telecom Ventures, L.L.C., Miami, FL (US)

( * ) Notice: Subject to any disclaimer, the term of this patent is extended or adjusted under 35 U.S.C. 154(b) by 1355 days.

(21) Appl. No.: 11/754,590

(22) Filed: May 29, 2007

(65) Prior Publication Data

US 2007/0280167 A1   Dec. 6, 2007

Related U.S. Application Data

(60) Provisional application No. 60/803,405, filed on May 30, 2006.

(51) Int. Cl.
*H04L 12/26* (2006.01)
(52) U.S. Cl. ...... 370/251; 370/255; 370/339; 455/456.1
(58) Field of Classification Search ................. 370/335, 370/342; 375/146; 455/450, 456
See application file for complete search history.

(56) References Cited

U.S. PATENT DOCUMENTS

| 6,968,194 | B2 * | 11/2005 | Aljadeff et al. | ............ 455/456.1 |
| 2003/0162547 | A1 | 8/2003 | McNair | |
| 2006/0083189 | A1 * | 4/2006 | Laroia et al. | .................. 370/319 |
| 2007/0254596 | A1 * | 11/2007 | Corson et al. | .................. 455/68 |
| 2010/0091702 | A1 * | 4/2010 | Luo et al. | ....................... 370/328 |

FOREIGN PATENT DOCUMENTS

WO   WO 97/47148 A2   12/1997

OTHER PUBLICATIONS

International Search Report and Written Opinion for PCT/US2007/012733; Dec. 10, 2007.

* cited by examiner

*Primary Examiner* — Donald Mills
*Assistant Examiner* — Henry Baron
(74) *Attorney, Agent, or Firm* — Myers Bigel Sibley & Sajovec, P.A.

(57) ABSTRACT

An enhanced-range beacon signal transmitted from a wireless terminal in a frequency band used by the wireless OFDM communications system for OFDM communications. The beacon may be received at each of a plurality of base stations of the wireless OFDM communications system. A location of the wireless terminal may be determined responsive to reception of the beacon signal at the plurality of base stations. In some embodiments, the beacon signal includes a narrowband beacon signal, which may be centered at a frequency offset with respect to a set of subcarriers used in the wireless OFDM communications system, for example, between adjacent subcarriers of the wireless OFDM system and/or in a guard band of the OFDM frequency band.

42 Claims, 6 Drawing Sheets

METHODS, APPARATUS AND COMPUTER PROGRAM PRODUCTS FOR BEACON GENERATION AND PROCESSING IN AN OFDM COMMUNICATIONS SYSTEM

RELATED APPLICATION

The present application claims the benefit of U.S. Provisional Patent Application Ser. No. 60/803,405, filed May 30, 2006 and incorporated herein by reference in its entirety as if the text thereof were physically present.

FIELD OF THE INVENTION

The present invention relates to wireless communications methods, apparatus and computer program products and, more particularly, to methods, apparatus and computer program products for orthogonal frequency division multiplexed (OFDM) communications.

BACKGROUND OF THE INVENTION

Orthogonal frequency division multiplexed (OFDM) communications systems use a digital multi-carrier modulation scheme in which symbol components are transmitted over multiple frequency-spaced subcarriers using a relatively low symbol rate. Among potential advantages of wireless OFDM communications systems are improved resistance to narrowband interference and frequency-selective fading. Conventional wireless OFDM communications systems include WiFi wireless local area networks conforming to the IEEE 802.11(g) standards and WiMAX metropolitan area networks (MANs) conforming to the IEEE 802.16 standards. Wireless MANs, such as some WiMAX MANs, may support mobile terminal operations using a cellular architecture employing multiple distributed base stations.

Recent years have seen the migration of telephony services from traditional circuit-switched approaches to packet-switched approaches that convey voice and other information over the internet. For example, VoIP (voice over IP) protocols may use a broadband internet connection to provide telephony services substantially similar to services provided by traditional circuit-switched telephony networks. Wireless networks that support IP transport, such WiMAX networks, may be used for VoIP and similar telephony applications.

Among the services supported by conventional telephone networks is location determination in support of emergency response. For example, in an "E911" service, dialing "911" at traditional telephone in most of the United States and Canada will link the caller to an emergency dispatch center, which receives information identifying the location for the origin of the call from the telephone network. Cellular telephone system operators are migrating their networks to provide a similar locating capability using, for example, GPS (global positioning system) chips located in terminals and/or triangulation using multiple base stations. If 911 is dialed from a VoIP service, the call may not go anywhere at all, or it may go to a location that is not particularly near the caller. In May 2005 the FCC issued an order requiring VoIP providers to offer 911 service to all their subscribers, but some VoIP providers have yet to meet these requirements.

SUMMARY OF THE INVENTION

Some embodiments of the present invention provide methods of operating a wireless orthogonal frequency division multiplexed (OFDM) communications system. An enhanced-range beacon signal transmitted from a wireless terminal in a frequency band used by the wireless OFDM communications system for OFDM communications is received at each of a plurality of base stations of the wireless OFDM communications system. A location of the wireless terminal may be determined responsive to reception of the beacon signal at the plurality of base stations.

In some embodiments, the beacon signal includes a narrowband beacon signal. A beacon signal may be centered at a frequency offset with respect to a set of subcarriers used in the wireless OFDM communications system. The beacon signal may, for example, be centered between adjacent subcarriers of the wireless OFDM system and/or in a guard band of the OFDM frequency band. The beacon signal may include a plurality of frequency-spaced beacon signals. Determination of the location of the wireless terminal may include determining respective reception timings of the beacon signal at the respective base stations and determining the location of the wireless terminal responsive to the determined reception timings. Further embodiments provide wireless OFDM communications systems configured to perform such operations and/or computer program products including computer program code configured to cause the wireless OFDM communications system to perform such operations.

Further embodiments of the present invention provide methods of operating a wireless terminal. An enhanced-range beacon signal is transmitted from the terminal in an OFDM frequency band used by a wireless OFDM communications system for OFDM communications. The enhanced-range beacon signal is configured to be contemporaneously received by a plurality base stations of the wireless OFDM communications system. The beacon signal may include a narrowband beacon signal, for example, a narrowband signal generated by concentrating transmit power of the terminal in the OFDM frequency band in the beacon signal. The beacon signal may be transmitted at a power level substantially greater than a maximum power level for transmissions by the terminal over subcarriers of the wireless OFDM communications system defined in the OFDM frequency band. The beacon signal may be centered at a frequency offset with respect to a set of subcarriers used in the wireless OFDM communications system, e.g., the beacon signal may be centered between adjacent subcarriers of the wireless OFDM system and/or in a guard band of the OFDM frequency band. The beacon signal may include a plurality of frequency-spaced beacon signals. Further embodiments provide wireless terminals configured to perform such operations and/or computer program products including computer program code configured to cause the wireless terminal to perform such operations.

Additional embodiments of the present invention provide methods of operating a wireless OFDM communications system in which a beacon signal transmitted from a wireless terminal in an OFDM frequency band used by the wireless OFDM communications system is received at a base station, wherein the beacon signal is centered at a frequency offset with respect to a set of subcarriers used in the wireless OFDM communications system. A location measurement is generated responsive to the received beacon signal. The beacon signal may be received at a plurality of base stations, and respective location measurements corresponding to respective ones of the base stations may be generated responsive to receipt of the beacon signal at the respective base stations. The methods may further include determining a location of the wireless terminal responsive to the location measurements. In some embodiments, the beacon signal is centered between subcarriers and/or in a guard band. Further embodiments provide wireless OFDM communications systems configured to perform such operations and/or computer program products including computer program code configured to cause a wireless OFDM communications system to perform such operations.

Still further embodiments of the present invention provide methods of operating a wireless terminal in which a beacon signal is transmitted in an OFDM frequency band used by a wireless OFDM communications system, wherein the beacon signal is centered at a frequency offset with respect to a set of subcarriers used in the wireless OFDM communications system. The beacon signal may be configured to be received by a plurality of base stations of the wireless OFDM communications system. The beacon signal may be transmitted at a power level substantially greater power level than a maximum power level of transmissions by the terminal over subcarriers defined in the OFDM frequency band. The beacon signal may be centered between subcarriers and/or in a guard band of the OFDM frequency band. Further embodiments provide wireless terminals configured to perform such operations and computer program products including computer program code configured to cause a wireless terminal to perform such operations.

Some embodiments of the present invention provide methods of operating a wireless OFDM communications system in which a base station of the wireless OFDM communications system receives a plurality of frequency-spaced beacon signals transmitted from a wireless terminal in a frequency band used by the wireless OFDM communications system for OFDM communications. A location measurement is generated responsive to the received plurality of beacon signals. The beacon signals may include narrowband beacon signals, which may be centered between subcarriers and/or in a guard band. Further embodiments provide wireless OFDM communications systems configured to perform such operations and/or computer program products including computer program code configured to cause a wireless OFDM communications system to perform such operations.

Still further embodiments of the present invention provide methods of operating a wireless terminal in which the terminal transmits a plurality of frequency-spaced beacon signals in an OFDM frequency band used by a wireless OFDM communications system for OFDM communications. Further embodiments provide wireless terminals configured to perform such operations and computer program products including computer program code configured to cause a wireless terminal to perform such operations.

DETAILED DESCRIPTION OF EMBODIMENTS OF THE INVENTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

As will be appreciated by one of skill in the art, the present invention may be embodied as methods, apparatus or computer program products. Accordingly, the present invention may take the form of hardware or a combination of hardware and/or software, generally referred to herein as a "circuit" or "circuitry." Furthermore, the present invention may take the form of a computer program product on a computer usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

It should also be noted that in some alternate implementations, the functions/acts noted in the flowchart blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts may be separated into multiple blocks and/or the functionality of two or more blocks of the flowcharts may be at least partially integrated.

Some embodiments of the invention provide methods, apparatus and computer program products supporting use of an enhanced-range beacon signal in an OFDM band, the beacon signal being useful for uniquely identifying a wireless terminal at ranges or within areas of great attenuation (in buildings, mines, etc) where the OFDM system may be unreliable. This beacon signal can further be used for locating the terminal using direction finding and position locating techniques, such as Time Difference of Arrival (TDOA) and Angle of Arrival (AOA). The beacon signal can also be used for other purposes. The generation of this beacon signal can be initiated automatically and/or initiated by action of the terminal and/or the system infrastructure.

In particular, OFDM modulation utilizes numerous orthogonally spaced subcarriers to form a broadband carrier. A potential advantage of OFDM arises from the fact that all the subcarriers' carriers are much narrower than the entire carrier, and therefore exhibit a longer symbol duration associated with any data being broadcast over the subcarriers. A consequence of OFDM is that the total power of the carrier is shared among the subcarriers, and the total power requirement of the transmitter's power amplifier (PA) may exceed the average power of the carrier by 10 dB.

By taking advantage of the capability of a terminal's OFDM radio transmitter to produce significantly greater power over smaller carriers and the ability of a modern radio to potentially develop multiple waveforms, the OFDM transmitter could be designed to generate a single or limited number of subcarriers at substantially higher power levels, instead of multiple subcarriers. This single subcarriers could be the recipient of the entire power delivered by the terminal's PA, for example, lifting it 10 dB or more above the nominal maximum power level for subcarriers used in normal OFDM communications. In addition, the narrowband beacon may be configured to operate against a lower noise floor than the OFDM subcarriers, which may increase receiver sensitivity and therefore the range and/or ability of the signal to penetrate obstacles.

According to some embodiments, because an OFDM system may use hundreds or thousands of orthogonally referenced subcarriers, a beacon signal with a shifted center frequency (so as to show up as a distinct carrier not related to any other normal communication) and/or generated within a guard band can be used to identify a single device or a member of a group of devices. The granularity may be dependent, for example, on the number of beacons and the number of devices in service. For example, a single user may be assigned a unique beacon carrier and/or a group of users may be assigned to a unique beacon carrier, which can change over time. Further granularity in identifying a single user from the subgroup could be accomplished by including information in the beacon using, for example, the timing of repetition rate, modulating data on the beacon carrier, transmitting a pattern of beacons in series or other techniques.

At the receiving (e.g., base) station, an offset beacon carrier may be seen as a carrier unrelated to and overlapping orthogonal subcarriers from other users. A guard band beacon carrier may be seen as an independent carrier distinguishable from the main OFDM subcarriers. If the system has knowledge of the spacing and modulation of the beacon carrier, it may recognize the beacon carrier as a beacon instead of an interfering signal. The system can then make a determination of what action to take to react to the beacon. For example, it may stop other routine communications to allow precise capture of the information transmitted on the beacon, it may synchronize with the beacon and transmit back to the user generating the beacon, it may engage a subsystem providing location measurements and/or it may take other actions.

Accordingly, some embodiments of the invention can allow a broadband OFDM transmitter to utilize much or all available transmit power in a narrow channel (a beacon transmission) for the purpose of increasing range and/or reliability of its signal for emergency or critical unit identification and communications and/or for other purposes. Embodiments of the invention may provide for use of an OFDM guard band for supporting narrow band signals. Some embodiments may provide OFDM communications apparatus, methods and/or computer program products capable of recognizing the beacon transmission and taking action appropriate to the circumstance that resulted in the generation of the beacon. Some embodiments may provide use of a beacon transmission for position location or use of a beacon transmission for communication of additional information.

Figure 1:
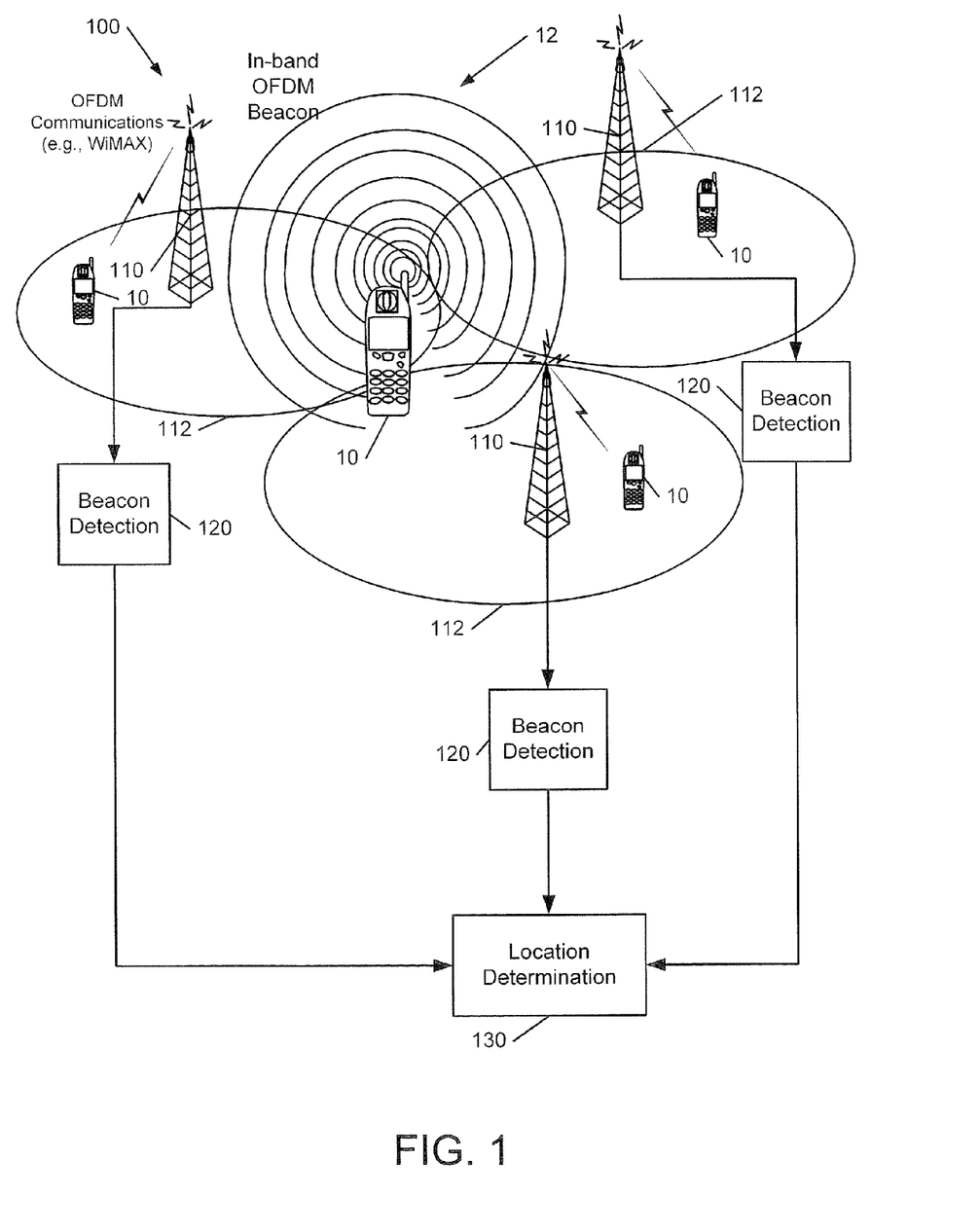
FIG. 1 is a schematic diagram illustrating apparatus and operations for terminal beacon generation and reception in a wireless OFDM communications system according to some embodiments of the present invention.

FIG. 1 illustrates a wireless OFDM communications system 100 according to some embodiments of the present invention. The system 100 includes a plurality of geographically distributed base stations 110 that serve respective coverage areas 112. The base stations 110 are configured to support OFDM communications with wireless terminals 10 within the respective coverage areas 112. For example, the base stations 110 and terminals 10 may communicate according to the OFDM air interface specified under the mobile WiMAX standards (IEEE 802.16e).

As further illustrated, in addition to supporting OFDM communications with the base stations 110, a terminal 10 may be capable of transmitting a beacon signal 12 in the same OFDM frequency band used for the OFDM communications of the terminals and base stations 110 that may be contemporaneously received by multiple ones of the base stations 110. Beacon detection circuitry 120, operatively associated with the base stations 110, may detect the beacon signal 12 and provide information (e.g., ranging information, such as propagation time or distance) that supports location determination circuitry 130. The location determination circuitry 130 may be configured to determine a location (e.g., latitude/longitude or other coordinates) for the beacon-transmitting terminal 10 responsive to the information provided by the beacon detection circuitry 120.

It will be understood that the beacon detection circuitry 120 and the location determination circuitry 130 may be implemented in a number of different ways. For example, the beacon detection circuitry 130 may include an OFDM receiver configured to support OFDM communications with terminals 10 and to discriminate the beacon signal 12 from other OFDM signals that bear OFDM communications traffic and/or or a separate receiver tuned to receive such beacon signals. The location determination circuitry 130 may be located at the base stations 110, at nodes (e.g., access service network gateways (ASN-GWs)), that couple the base stations 110 to an IP network that links the base stations 110, or at one or more nodes of the linking IP network, or may include circuitry distributed across multiple ones of such nodes.

Figure 2A:
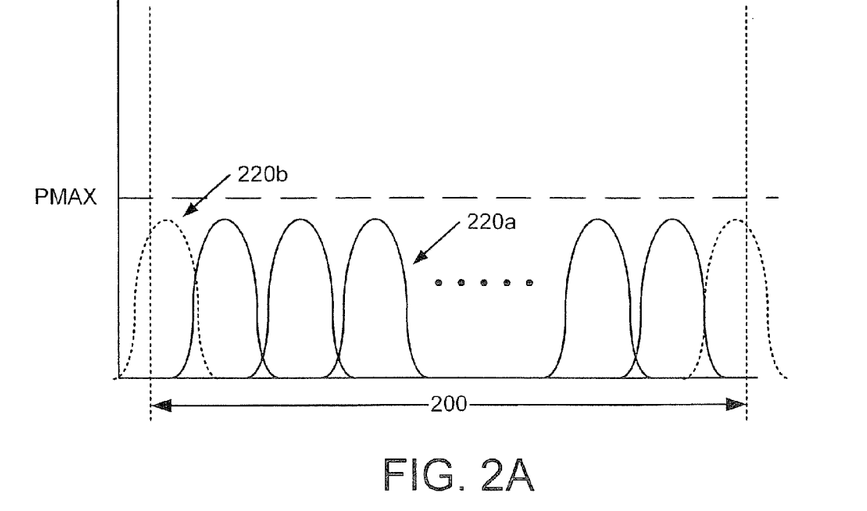
FIGS. 2A and 2B are spectrum diagrams illustrating generation of a narrowband beacon in an OFDM frequency band according to some embodiments of the present invention.
Figure 2B:
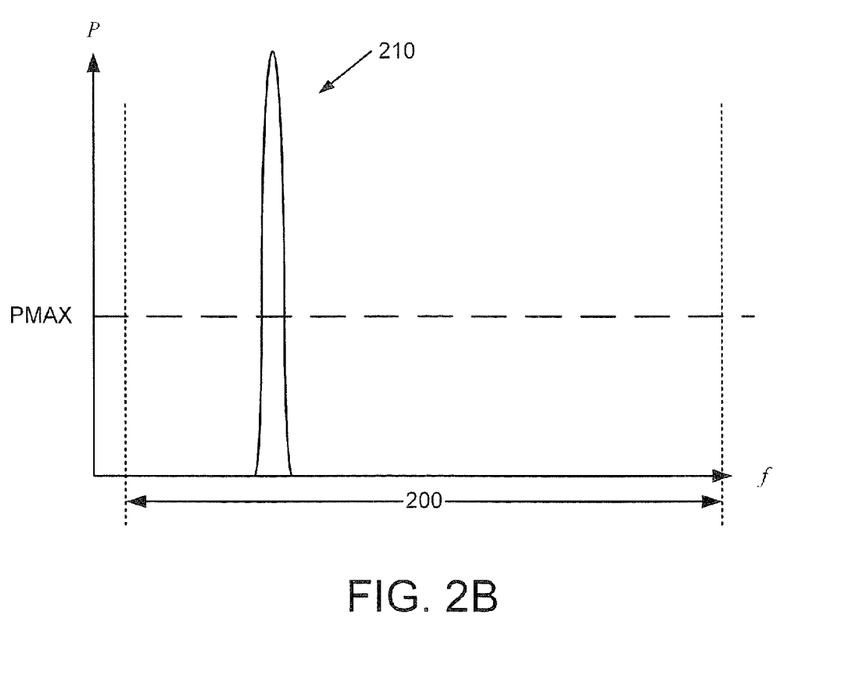

The OFDM beacon signal 12 may take various forms. For example, as shown in FIGS. 2A and 2B, multiple subcarriers may be defined for a wireless OFDM communications (e.g., mobile WiMAX) system in an OFDM frequency band. As shown, the subcarriers may include subcarriers 220a used for communications (e.g., data) and "null" subcarriers 220b that are used as "guard" bands. As shown in FIG. 2A, OFDM communications signals may be communicated at or below a maximum power level PMAX using the subcarriers 220a.

Figure 3:
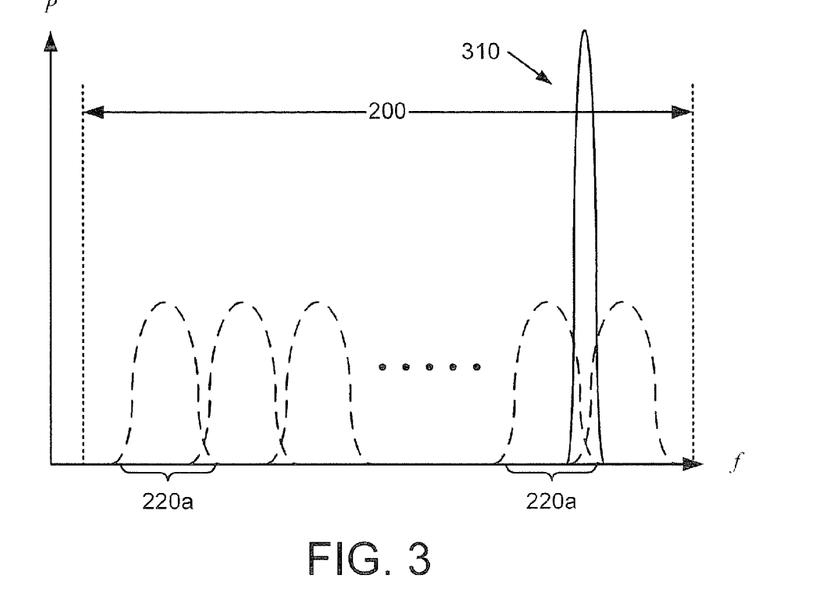
FIGS. 3-6 are spectrum diagrams illustrating various beacon signal configurations for a wireless OFDM communications system according to further embodiments of the present invention.
Figure 4:
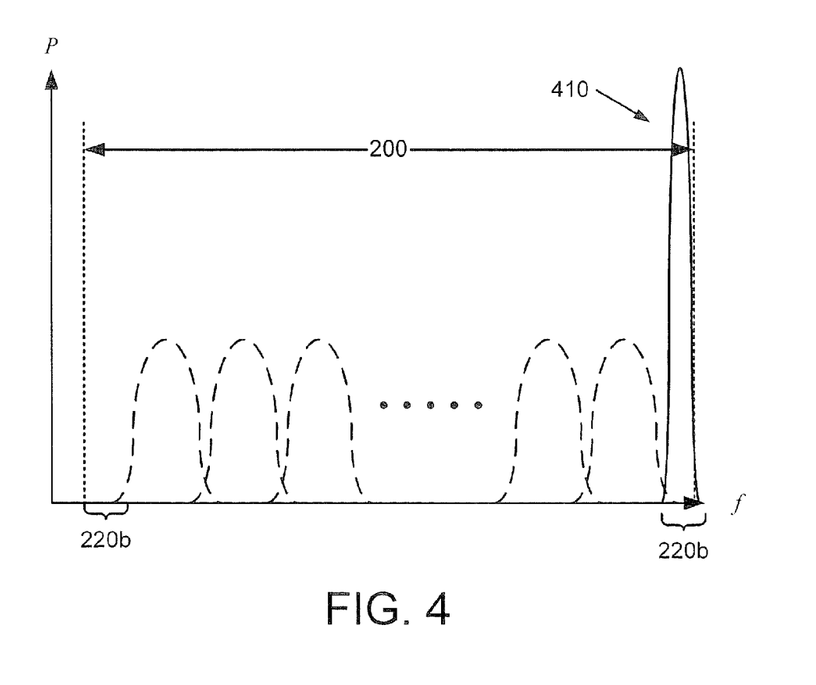
Figure 5:
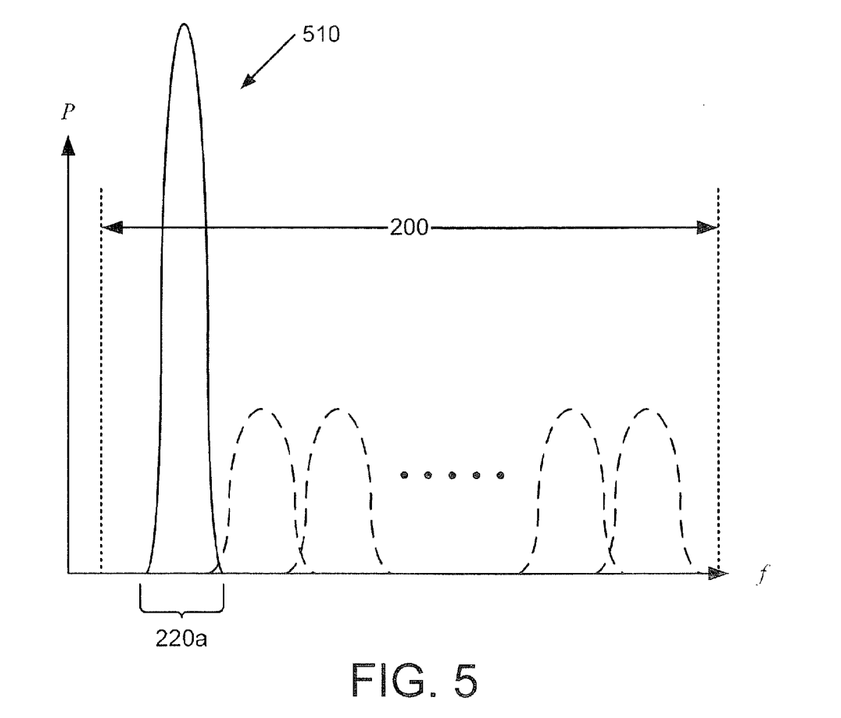

Referring to FIG. 2B, a beacon 210 may be transmitted in the form of a narrowband signal with substantially higher power than the maximum power level PMAX of individual ones of the active subcarriers 220a in the OFDM band 200. In some embodiments, the narrowband beacon signal 310 may, as shown in FIG. 3, be transmitted with a center frequency that falls between adjacent active subcarriers 220a. In some embodiments shown in FIG. 4, a high-power narrowband beacon signal 410 may be transmitted with a center frequency located at a guard band subcarriers location 220b of the OFDM system. As shown in FIG. 5, a high-power narrowband beacon 510 may be transmitted in an active subcarriers location 220a at substantially higher power than signals using other subcarriers 220a.

It will be understood that timings of beacon signal transmissions according to some embodiments of the present invention may vary. For example, a terminal may transmit its beacon signal intermittently, e.g., during times when the terminal is not transmitting over regular OFDM subcarriers. In some embodiments, a terminal may transmit its beacon signal concurrent with some OFDM subcarriers transmissions, for example, when transmit power required for the subcarriers transmissions leaves adequate margin for concurrent transmission of the beacon.

Figure 6:
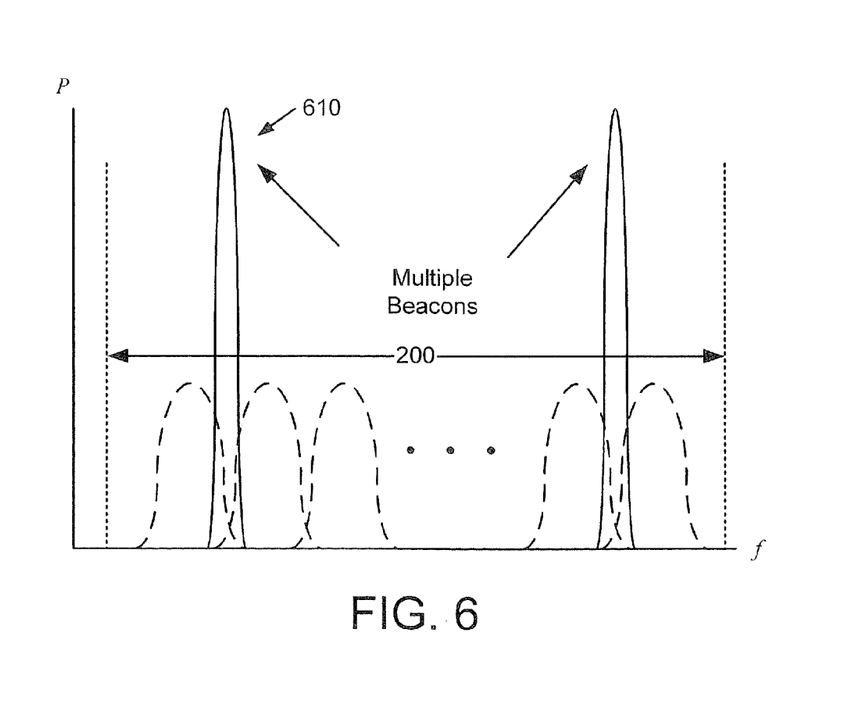

A variety of techniques may be used to allow such beacon signals to be detected at greater range and/or with greater accuracy. For example, as shown in FIG. 6, multiple narrowband beacons 610 may be transmitted using, for example, offset carrier positioning along the lines shown in FIG. 3. Using such multiple beacons may allow a base station to more readily detect a beacon signal in the presence of fading and interference. Multiple beacons may also allow a receiving station to obtain a more accurate determination of distance to the transmitting terminal, e.g., averaging of propagation time estimate for such multiple signals may be used to compensate for fading, reflections, interference and other disturbances. It will be appreciated that other techniques, such as coding and/or bit repetition, may also be used to enhance range of a beacon signal. In some embodiments, information, such as terminal identification information and/or additional data, may be imposed on the beacon signal. Such information may be used, for example, to provide further identification of the beacon, location information (e.g., coordinates) and/or critical information, such as emergency status information.

Figure 7:
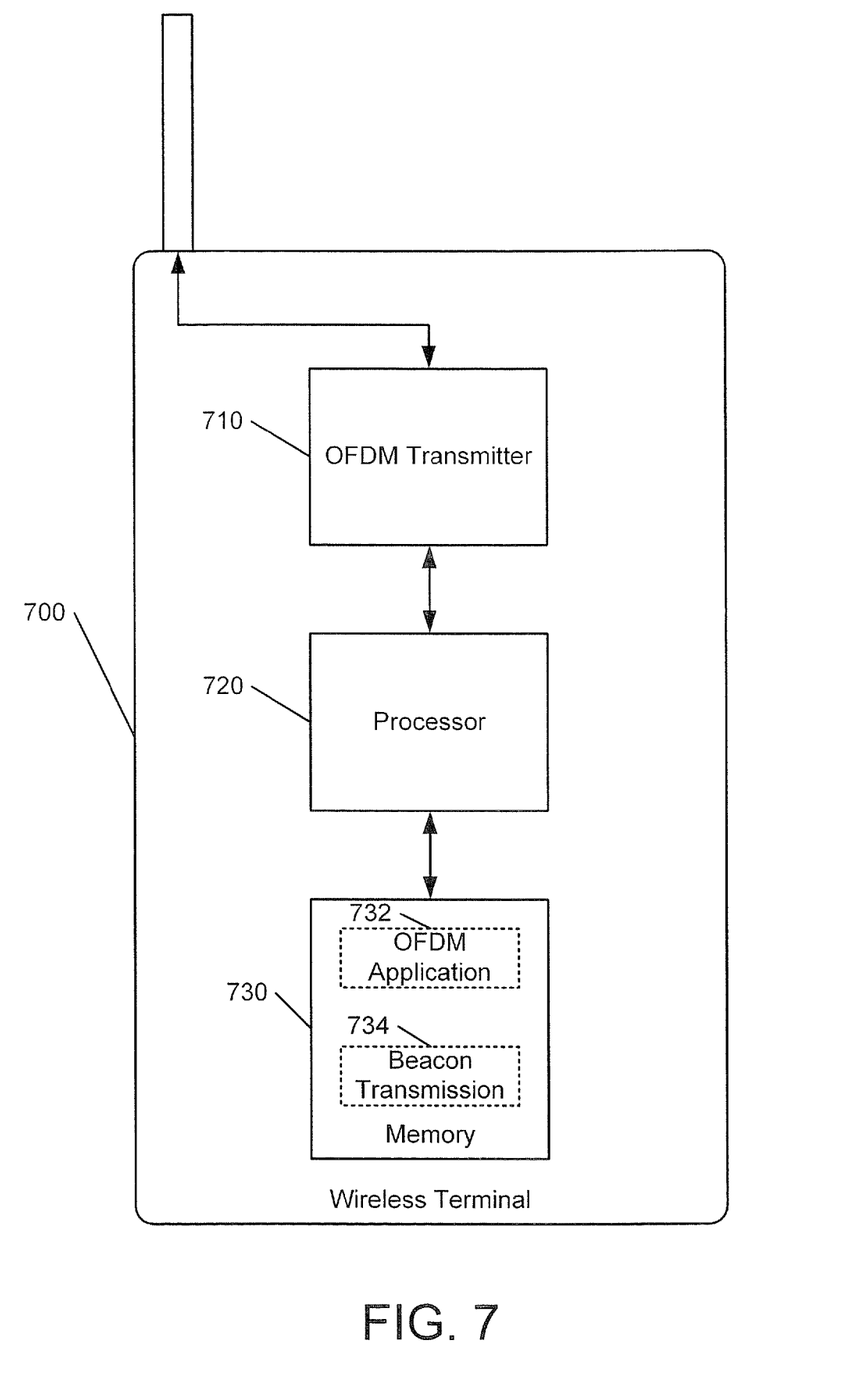
FIG. 7 is a schematic diagram of a wireless terminal illustrating apparatus and operations for in-band OFDM beacon generation according to some embodiments of the present invention.

As noted above, provision of such a beacon signal may take advantage of existing circuitry used for OFDM communications. For example, as shown in FIG. 7, a wireless terminal 700 according to some embodiments of the present invention may include an OFDM transmitter 710 that is configured to transmit OFDM signals for data, voice or other applications under control of a processor 720 and associated memory 730. The processor 720 and memory 730 may be configured to execute applications 732, e.g., VoIP applications, that utilize the OFDM transmitter 710 to communicate over defined subcarriers of an OFDM system, such as a WiMAX system. The processor 720 and memory 730 may also be configured to execute a beacon transmission application 734 that reconfigures the OFDM transmitter 710 to transmit in-band beacons, such as the beacons discussed above with reference to FIGS. 1-6. For example, the beacon transmission application 734 may cause the OFDM transmitter 710 to utilize much or all available transmit power in a narrow frequency range within an OFDM frequency band to increase range and/or reliability of its signal for emergency or critical unit identification and communications and/or for other purposes.

It will be appreciated that the terminal configuration described above is provided for purposes of illustration, and that other implementations may be used within the scope of the present invention. For example, rather than using processor-controlled beacon generation as described above, a wireless terminal may include hardware and/or firmware that performs similar beacon transmission operations.

According to some embodiments of the present invention, a beacon signal along the lines discussed above may be used for determining the location of a wireless terminal. In a typical conventional OFDM system employing frequency reuse, the coverage of any individual base station may be managed to avoid co-channel interference. The power of a wireless terminal may be limited such that it is generating only enough power to satisfy its communication link requirements, i.e., to present sufficient signal strength at the base station receiver to provide a desired signal quality. This may result in a situation where the terminal may not be consistently heard by other base stations.

Triangulation may be used to locate a wireless terminal, for example, by using information received from the terminal at a minimum of two base stations that can hear the signal and derive its angle of arrival and/or time of arrival. If more than two stations hear the terminal, a potentially more accurate location determination may be made. A beacon signal along the lines discussed above may increase range by increasing power and/or decreasing the channel noise bandwidth such that the beacon signal may be used for triangulation or other location determination techniques. Enhanced power and decreased channel noise may result in an increase of useable communication range at a cost in the information-carrying capacity of the signal. However, information capacity may not be important for location determination, such that this trade-off may be acceptable.

According to some embodiments, an enhanced-range beacon that can be received at multiple stations may be used for generation of position-related measurements, such as TDOA and AOA measurements, that may be used by common multi-lateration platforms, such as the Geometrix® MLC mobile location system provided by Andrew Corporation, or hardware and/or software designed to perform similar location determination functions. Functions that use measurements of signal reception with respect to a timing reference for ranging purposes, such as power control (e.g., the ranging function included in the WiMAX), may also be used to generate distance measurements for use in triangulation-based location determination according to some embodiments of the present invention.

Figure 8:
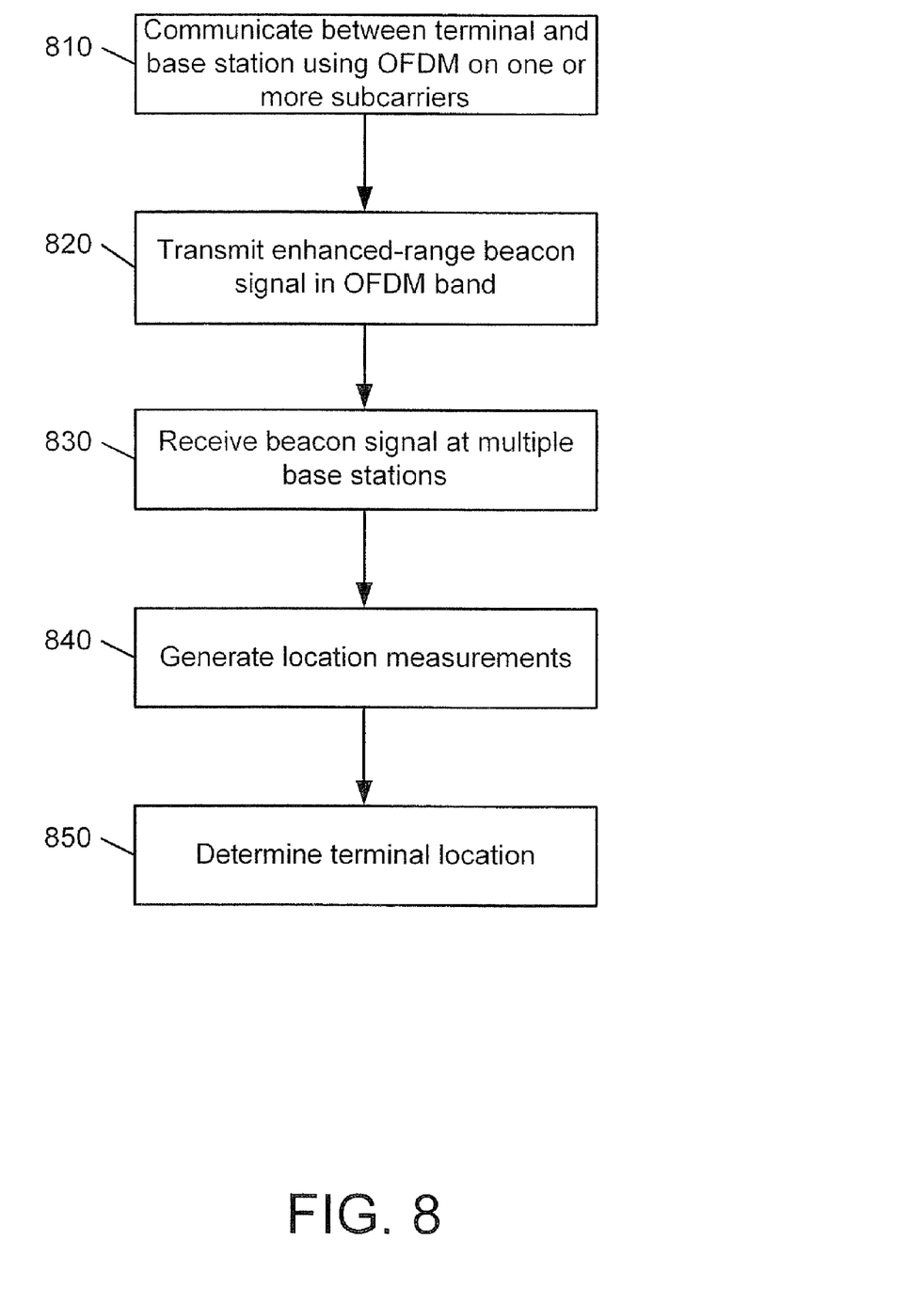
FIG. 8 is a flowchart illustrating exemplary operations for terminal location using an in-band beacon in an OFDM communications system according to further embodiments of the present invention.

FIG. 8 illustrates exemplary operations for using a beacon signal for terminal position determination according to further embodiments of the present invention. Communications are conducted between a terminal and a base station using OFDM in an OFDM frequency band (block 810). The terminal transmits an enhanced-range beacon signal, e.g., a higher-power narrowband beacon signal along the line described with reference to FIGS. 1-6 (block 820). The beacon signal is received at multiple base stations (block 830). Responsive to reception of the beacon signal, respective location measurements for the terminal with respect to the respective receiving base stations are generated (block 840). Based on the terminal location information and the known location of the base stations, a location of the terminal may be determined using, for example, triangulation techniques (block 850). The determined location may be used to support location-based services, such as emergency assistance services.

As noted above, an OFDM in-band beacon signal according to some embodiments of the present invention may be used for a variety of purposes. For example, such a beacon signal may be used to convey information from a wireless terminal when the terminal is in a propagation-impeded, e.g., obstructed, environments in which regular OFDM communications are prevented. As further noted, such beacon signals may also be used for terminal location determination applications, such as might be used to support E911 and other location-based services.

In the drawings and specification, there have been disclosed exemplary embodiments of the invention. Although specific terms are employed, they are used in a generic and descriptive sense only and not for purposes of limitation, the scope of the invention being defined by the following claims.

What Is claimed:

1. A method comprising:
receiving at each of a plurality of base stations of the a wireless OFDM communications system an enhanced-range beacon signal transmitted from a wireless terminal in an OFDM frequency band used by the wireless OFDM communications system for OFDM communications, the beacon signal centered at a frequency distinct from any OFDM subcarriers defined in the OFDM frequency band for the wireless OFDM communications system; and
determining a location of the wireless terminal responsive to reception of the beacon signal at the plurality of base stations.

2. The method of claim 1, wherein the beacon signal comprises a narrowband beacon signal.

3. The method of claim 1, wherein the beacon signal comprises a plurality of frequency-spaced beacon signals.

4. The method of claim 1, wherein the beacon signal is centered between adjacent subcarriers of the wireless OFDM system and/or in a guard band of the OFDM frequency band.

5. The method of claim 1, wherein determining a location of the wireless terminal comprises:
determining respective reception timings of the beacon signal at the respective base stations; and
determining the location of the wireless terminal responsive to the determined reception timings.

6. A wireless OFDM communications system configured to perform the method of claim 1.

7. A computer program product comprising computer program code embodied in a non-transitory computer readable storage medium, the computer program code comprising program code configured to cause the wireless OFDM communications system to perform the method of claim 1.

8. A method of operating a wireless terminal, the method comprising:
transmitting an enhanced-range beacon signal in an OFDM frequency band used by a wireless OFDM communications system for OFDM communications, the enhanced-range beacon signal configured to be received by a plurality base stations of the wireless OFDM communications system, the beacon signal centered at a frequency distinct from any OFDM subcarriers defined in the OFDM frequency band for the wireless OFDM communications system.

9. The method of claim 8, wherein the beacon signal comprises a narrowband beacon signal.

10. The method of claim 8, wherein transmitting an enhanced-range beacon signal comprises concentrating transmit power of the terminal in the OFDM frequency band in the beacon signal.

11. The method of claim 8, wherein transmitting an enhanced-range beacon signal in an OFDM frequency band of a wireless OFDM communications system comprises transmitting the beacon signal at a power level substantially greater than a maximum power level for transmissions by the terminal over subcarriers of the wireless OFDM communications system defined in the OFDM frequency band.

12. The method of claim 8, wherein the beacon signal is centered between adjacent subcarriers of the wireless OFDM system and/or in a guard band of the OFDM frequency band.

13. The method of claim 8, wherein the beacon signal comprises a plurality of frequency-spaced beacon signals.

14. A wireless terminal configured to perform the method of claim 8.

15. A computer program product comprising computer program code embodied in a non-transitory computer readable storage medium, the computer program code comprising program code configured to cause the wireless terminal to perform the method of claim 8.

16. A method of operating a wireless OFDM communications system, the method comprising:
receiving at a base station of the wireless OFDM communications system a beacon signal transmitted from a wireless terminal in an OFDM frequency band used by the wireless OFDM communications system, the beacon signal centered at a frequency distinct from any OFDM subcarriers defined in the OFDM frequency band for the wireless OFDM communications system; and
generating a location measurement responsive to the received beacon signal.

17. The method of claim 16:
wherein receiving at a base station of the wireless OFDM communications system a beacon signal transmitted from a wireless terminal comprises receiving the beacon signal at each of a plurality of base stations;
wherein generating a location measurement responsive to the received narrowband beacon signal comprises generating respective location measurements corresponding to respective ones of the base stations responsive to receipt of the beacon signal at the respective base stations; and wherein the method further comprises determining a location of the wireless terminal responsive to the location measurements.

18. The method of claim 16, wherein the beacon signal is centered between subcarriers and/or in a guard band.

19. The method of claim 16, wherein the beacon signal comprises a plurality of frequency-spaced beacon signals.

20. A wireless OFDM communications system configured to perform the method of claim 16.

21. A computer program product comprising computer program code embodied in a non-transitory computer readable storage medium, the computer program code comprising program code configured to cause the wireless OFDM communications system to perform the method of claim 16.

22. A method of operating a wireless terminal, the method comprising:

transmitting a beacon signal in an OFDM frequency band used by a wireless OFDM communications system, the beacon signal centered at a frequency distinct from any OFDM subcarriers defined in the OFDM frequency band for the wireless OFDM communications system.

23. The method of claim 22, wherein the beacon signal is configured to be received by a plurality of base stations of the wireless OFDM communications system.

24. The method of claim 22, wherein transmitting a beacon signal in an OFDM frequency band of a wireless OFDM communications system comprises frequency-concentrating transmit power of the terminal in the OFDM frequency band in the beacon signal.

25. The method of claim 22, wherein transmitting a beacon signal in an OFDM frequency band of a wireless OFDM communications system comprises transmitting the beacon signal at a power level substantially greater power level than a maximum power level of transmissions by the terminal over subcarriers defined in the OFDM frequency band.

26. The method of claim 22, wherein the beacon signal is centered between subcarriers and/or in a guard band of the OFDM frequency band.

27. The method of claim 22, wherein the beacon signal comprises a plurality of frequency-spaced beacon signals.

28. A wireless terminal configured to perform the method of claim 22.

29. A computer program product comprising computer program code embodied in a non-transitory computer readable storage medium, the computer program code comprising program code configured to cause the wireless terminal to perform the method of claim 22.

30. A method of operating a wireless OFDM communications system, the method comprising:

receiving at a base station of the wireless OFDM communications system a plurality of frequency-spaced beacon signals concurrently transmitted from a single wireless terminal in a frequency band used by the wireless OFDM communications system for OFDM communications; and generating a location measurement responsive to the received plurality of beacon signals.

31. The method of claim 30, wherein the beacon signals comprise narrowband beacon signals.

32. The method of claim 30, wherein the beacon signals are centered between subcarriers and/or in a guard band.

33. The method of claim 30:

wherein receiving at a base station of the wireless OFDM communications system a plurality of frequency-spaced beacon signals concurrently transmitted from a single wireless terminal in a frequency band used by the wireless OFDM communications system for OFDM communications comprises receiving the beacon signals at each of a plurality of base stations;

wherein generating a location measurement responsive to the received plurality of beacon signals comprises generating respective location measurements corresponding to respective ones of the base stations responsive to receipt of the beacon signals at the respective base stations; and wherein the method further comprises determining a location of the wireless terminal responsive to the location measurements.

34. A wireless OFDM communications system configured to perform the method of claim 30.

35. A computer program product comprising computer program code embodied in a non-transitory computer readable storage medium, the computer program code comprising program code configured to cause the wireless OFDM communications system to perform the method of claim 30.

36. A method of operating a wireless terminal, the method comprising:

concurrently transmitting a plurality of frequency-spaced beacon signals in an OFDM frequency band used by a wireless OFDM communications system for OFDM communications.

37. The method of claim 36, wherein the beacon signals comprise narrowband beacon signals.

38. The method of claim 36, wherein transmitting a plurality of frequency-spaced beacon signals in an OFDM frequency band of a wireless OFDM communications system comprises concentrating transmit power of the terminal in the OFDM frequency band in the beacon signals.

39. The method of claim 36, wherein transmitting a plurality of frequency-spaced beacon signals in an OFDM frequency band of a wireless OFDM communications system comprises transmitting the beacon signals at a power level substantially greater power level than a maximum power level of transmissions by the terminal over subcarriers defined in the OFDM frequency band.

40. The method of claim 36, wherein the beacon signals are centered between subcarriers and/or in a guard band of the OFDM frequency band.

41. A wireless terminal configured to perform the method of claim 36.

42. A computer program product comprising computer program code embodied in a non-transitory computer readable storage medium, the computer program code comprising program code configured to cause the wireless terminal to perform the method of claim 36.

* * * * *

UNITED STATES PATENT AND TRADEMARK OFFICE
CERTIFICATE OF CORRECTION

PATENT NO. : 8,248,959 B2
APPLICATION NO. : 11/754590
DATED : August 21, 2012
INVENTOR(S) : Olexa et al.

It is certified that error appears in the above-identified patent and that said Letters Patent is hereby corrected as shown below:

In the Claims:
Column 9, Claim 1, Line 47: Please correct "plurality of base stations of the a"
to read -- plurality of base stations of a --

Signed and Sealed this
Ninth Day of April, 2013

Teresa Stanek Rea
*Acting Director of the United States Patent and Trademark Office*